Figure 4:
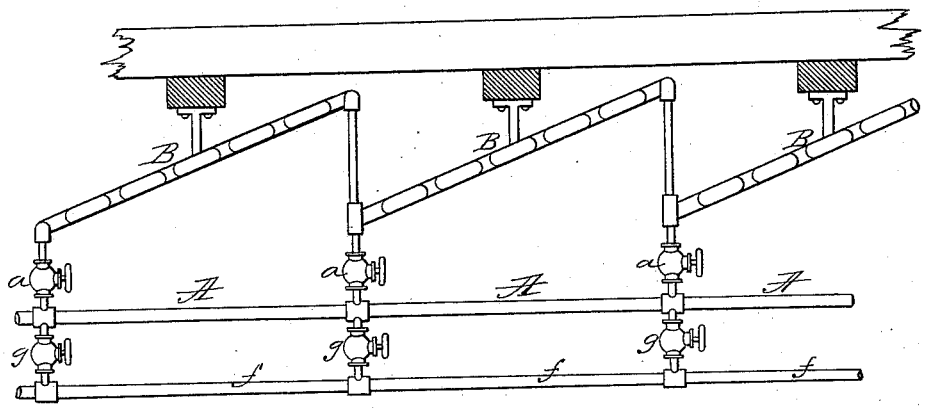

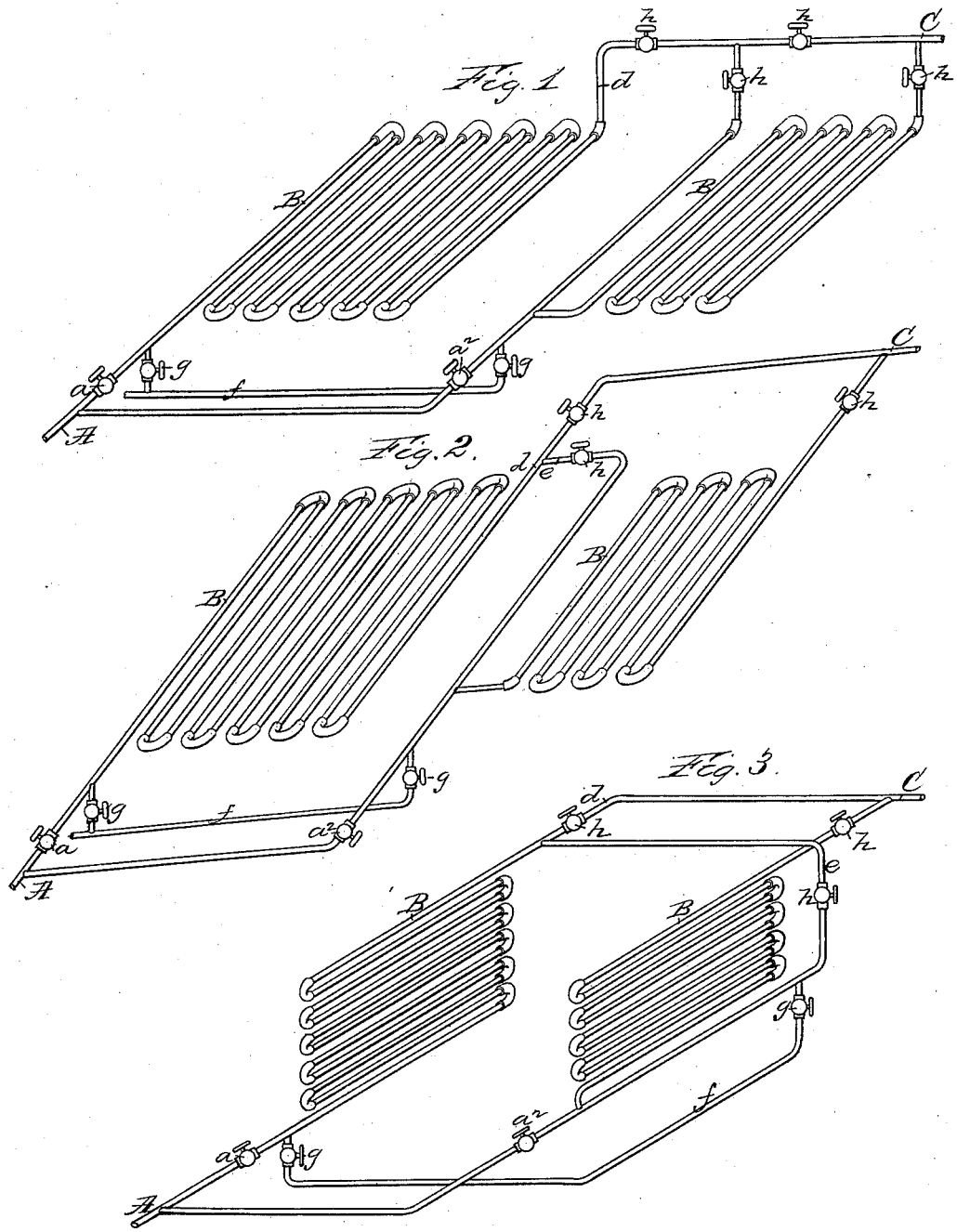

(No Model.) 2 Sheets—Sheet 2.

J. J. SUCKERT.
PROCESS OF ABSORBING HEAT FROM ROOMS OR MATERIAL BY USE OF A LIQUEFIED GAS.

No. 302,443. Patented July 22, 1884.

UNITED STATES PATENT OFFICE.

JULIUS J. SUCKERT, OF RIDGEWOOD, NEW JERSEY.

PROCESS OF ABSORBING HEAT FROM ROOMS OR MATERIAL BY USE OF A LIQUEFIED GAS.

SPECIFICATION forming part of Letters Patent No. 302,443, dated July 22, 1884.

Application filed January 17, 1884. (No model.)

*To all whom it may concern:*

Be it known that I, JULIUS J. SUCKERT, a citizen of the United States, residing in the town of Ridgewood, county of Bergen, and State of New Jersey, have invented new and useful Improvements in the Direct Application of Liquefiable Gases to the Cooling of Air in Rooms or Chambers or of Material placed therein, of which the following is a specification.

When it is desirable to reduce the temperature of rooms or chambers below that of the outside air by expanding or vaporizing a liquefied gas in coils, or a series of pipes placed in such rooms or chambers, it has hitherto been the custom to place these coils or connected pipes either on a level or on an incline, and in the latter case to allow the liquefied gas to enter the coils or connected pipes at their highest point, thus allowing the liquefied gas in either case to flow through the coils or connected pipes in small streams, bathing only the lower surface, hoping in this way to prevent its accumulation in the pipes, and thus economize in the quantity of the liquefied gas used for circulation. It has been proven by experience that this manner of applying it is a grave mistake, for the reason that there never is a sufficient quantity of the liquefied gas present to absorb the heat from the rooms with sufficient rapidity to make it either practical or economical. This is plainly to be seen in breweries, where fermentation is carried on, and in establishments for packing beef or pork, where the animal heat is to be absorbed from the carcasses of meat being prepared for the market. It is a well-known fact among experimenters in the line of refrigeration that oftentimes the main return-gas pipe is coated with frost, and sometimes with thick ice, even when exposed to the heat of the atmosphere and the burning rays of a summers's sun. The same thing is often seen within a hot engine-room and within a few feet of the live-steam pipe. It is often pointed to by operators as an indication of what their machines will do, whereas in reality it is a positive indication of injudicious management and improper application of the principles of refrigeration. The presence of the frost and ice upon the return-pipes under such conditions shows plainly that there must be liquefied gas present in said pipes and in sufficient quantity to convey the heat away with such rapidity that the return-pipe is kept constantly covered with frost. If this be the case when exposed to a temperature of 95° to 100° Fahrenheit and the outdoor atmosphere, there should be no excuse for not obtaining as favorable a condition of affairs in closed chill-rooms containing carcasses of meat, where, under no reasonable circumstances, could the temperature ever reach so high a degree. Hitherto, however, this has not been satisfactorily accomplished, and when meat or other material to be cooled (having a temperature perhaps not as high as the atmosphere) has been introduced in the chill-rooms to be cooled, and even though the heat-absorbing surface and the return-pipe is covered with frost, the coating of frost upon the heat-absorbing pipes in the chill-rooms has been melted off, causing not only a constant drip, which wets and musses the material being cooled, but charges the atmosphere with moisture, which is seriously objectionable and positively injurious to many things which it is desirable to preserve. The difficulty lies in not having a sufficient quantity of the refrigerating agent present within the heat-absorbing coils in the rooms where the heat is to be absorbed to convey away the heat as fast as conducted thereto, and to congeal upon the exterior of said coils any moisture which may arise. This is conclusive from the fact that but little of the liquefied gas flows from each coil to the return-pipe, but from several coils the aggregate supply to the return-pipe is sufficient to produce the result described. Many other difficulties attend the old system, such as the difficulty of regulating the expanding stop-cocks with the necessary precision to obtain the greatest work from the refrigerant without permitting it to freeze back to the compressors, congeal the lubricating and sealing liquid, and thereby break some of the valves or operating parts. This is a serious difficulty without considering the loss of power and the failure to utilize the entire heat-absorbing capacity of the refrigerant when once liquefied. Numerous devices have been formed for the close regulation of the expanding stop-cocks, but all to no purpose. The fault is with the system. I remedy these evils and accomplish the object in view—*i. e.*, absorb the heat with greater rapidity and maintain a drier atmosphere by constructing the heat-absorbing coils, and placing them in such a manner within the rooms where the heat is to be absorbed as to be able to maintain therein, as in a reservoir, a sufficient supply of the refrigerating agent in the liquefied condition to absorb the heat with as much rapidity as it is likely to be conducted thereto, except under extraordinary conditions, and then in utilizing the heat-absorbing capacity of the liquefied gas passing from such coils by passing it into and through other coils until its power of absorbing heat is practically exhausted, all of which will be more fully explained, reference being made to the drawings, wherein similar letters represent similar parts.

Figure 5:
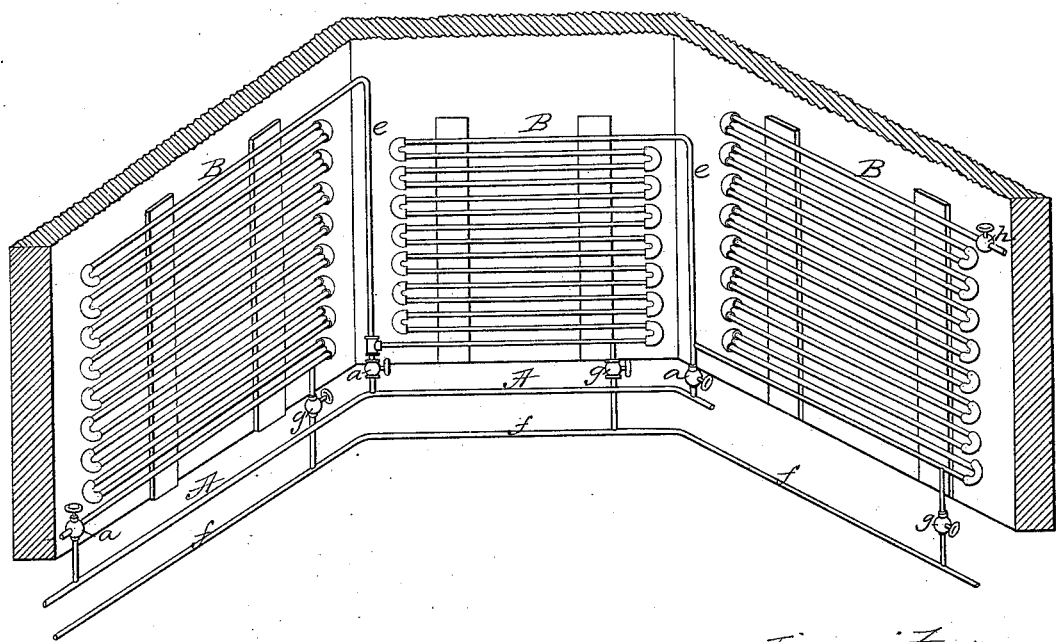

Figure 1 shows two heat-absorbing coils, which are placed in the rooms or chambers where the heat is to be absorbed, and in this instance are placed on a level, and wherein the gas or liquefied gas is applied direct for the absorption of heat, or upon what is generally known as the "direct expansion system." Fig. 2 shows similar coils placed upon an incline to effect the same purpose. Fig. 3 represents similar coils placed vertically, by which similar results are accomplished. Fig. 4 is an end view of several connected coils placed upon an incline for the same purpose. They may be separated and placed any distance apart, as occasion may require. Fig. 5 represents a coil of pipe placed vertically upon the side walls of a room, wherein the liquefied gas is introduced at the bottom of the coil.

Having at hand any of the well-known methods for liquefying gases, either by compression, absorption, or other machines, and a supply of liquefied gas, the liquefied gas is conveyed by pipes which connect in each case with the pipe A of the several figures. The expanding stop-cocks $a$ are then opened sufficiently wide to permit the entrance of the liquefied gas to the several coils B, wherein the pressure is very much less than the pressure upon the liquefied gas before injection. Heat conducted through the expansion-coils to the liquefied gas is absorbed by it, which causes ebullition of the liquefied gas to take place within such coils, throwing off from its surface that portion of itself which is vaporized or assumes a gaseous condition. The other end of the coil C being connected with pipes which return the gas for liquefaction, the gaseous part is either driven forward by the gas developed by the absorption of heat by the liquefied gas, or is drawn by a pump or other means away from the coils for liquefaction. By a proper adjustment of the expansion-cocks $a$ the coils will soon fill with the liquefied gas, and if the absorption of heat is not sufficiently great to vaporize it as fast as it flows in it will follow the rise of the pipes $d$ and overflow through the outlet $c$ into any other coil with which it may be connected, and so continue on from coil to coil until its heat-absorbing power is exhausted, or until the entire supply of the liquefied gas at the extreme end is vaporized. Similar pipes, $d$, in Figs. 1 and 3 answer the same purpose. It will be observed that by this means it can be arranged so that any quantity of liquefied gas can always be present within the coils, as in a reservoir, for the absorption of any ordinary amount of heat which it may be necessary to absorb, and with as much rapidity as it can be conducted through the pipes. If it be necessary to obtain a greater quantity of the liquefied gas in the second, third, or other coil beyond the flow of the liquid from a prior coil, it may be introduced through any of the other expanding stop-cocks with which each coil is supplied, as at $a^2$. This may be continued until the last coil is reached, where a little more care may be exercised in relation to the quantity of liquefied gas supplied, so that all of it may be vaporized and none returned to the compressor or other means of compression or liquefaction.

The pipes $f$ and cocks $g$ are to serve the purpose of drip-cocks to draw off any liquid or lubricant that may remain in the coils, should it be necessary at any time to empty them. The cocks $h$ can be used to shut off any one coil from another at any time that it may become necessary so to do.

Having described my invention, what I claim as new, and desire to secure by Letters Patent of the United States, is—

1. The process of absorbing heat in rooms or chambers, or from material in such chambers, which process consists in first liquefying a gas by mechanical or other means, and then introducing the said liquefied gas, under pressure, into a pipe or a number of connected pipes wherein the pressure is less than the pressure of the liquefied gas before injection or introduction into said pipes, when the said pipe or pipes are placed up an incline, or in a position to hold a body of such liquefied gas, as in a reservoir, within the rooms or chambers from which the heat is to be absorbed, and then passing the partially-expanded gas or the liquefied gas through other pipes, coils, or chambers similarly arranged for the absorption of heat, and then returning the gas back to a pump, still, or other device for reliquefaction, substantially as described.

2. The process of absorbing heat in rooms or chambers or from material in such chambers, which process consists in introducing a liquefied gas into a pipe or coil of pipe arranged to hold or temporarily retain the same, as in a reservoir, under a reduced pressure, and in the presence of the heat to be absorbed or within the rooms to be cooled, and then passing the overflowing liquefied gas from said pipe or coil of pipes into other pipes or coils similarly arranged for the absorption of heat, substantially as described.

3. The combination, with a heat-absorbing coil and one or more walls or ceilings of inclosed space, of a liquid-reservoir, connecting-pipes, and one or more heat-absorbing coils arranged and operating to admit a body of liquefied gas into and to fill one of said coils, and then permit the overflowing liquefied gas to pass into one or more of said coils and absorb heat therein, substantially as described.

4. The combination, with a heat-absorbing coil and one or more dividing-partitions of inclosed space, of one or more heat-absorbing coils and connecting-pipes, constructed, arranged, and operating to admit a liquefied gas into and to fill one coil, and then permit the overflowing liquefied gas to pass into one or more of said heat-absorbing coils, substantially as described.

5. The combination of two or more heat-absorbing coils with a liquid-reservoir, and one or more dividing-partitions of an inclosed space, when the said reservoir is supplied with a liquid, and is constructed, arranged, and operates to introduce a heat-absorbing liquid into and to fill one of said coils, and then permits the overflowing heat-absorbing liquid to pass into and fill another coil, substantially as described.

6. The combination of a heat-absorbing coil with a liquid-reservoir, one or more heat-absorbing coils, and a wall or ceiling of an inclosed space, when the said reservoir is constructed, arranged, and operates to admit a heat-absorbing liquid into and fill one or more pipes of one coil, and then permits a portion of said heat-absorbing liquid to pass into one or more pipes of another coil for the absorption of heat, substantially as described.

7. The combination of a liquid-reservoir, a heat-absorbing coil, connecting-pipes, and a wall or ceiling of an inclosed space, with one or more heat-absorbing coils secured to walls or ceilings of an inclosed space, the reservoir and coils connected, arranged, and operating to admit a heat-absorbing liquid into and to fill one or more pipes of one of the said coils, and then permit a part of the heat-absorbing liquid to pass into one or more pipes of another coil and absorb heat, substantially as described.

8. The combination of a heat-absorbing coil and the wall or ceiling of an inclosed space, with one or more heat-absorbing coils and connecting-pipes, when the said heat-absorbing coils are constructed, arranged, and operate to admit a heat-absorbing liquid into and to fill one coil, and then discharge the overflow of said heat-absorbing liquid into another coil, substantially as described.

9. The combination, with one or more dividing or separating partitions of inclosed space, of two or more heat-absorbing coils, constructed, arranged, and operating to admit a circulating refrigerating medium at the bottom of one coil to overflow and pass from the first coil into the bottom of one or more coils, substantially as described.

10. The combination, with a gas-liquefying apparatus, a liquid-reservoir, and one or more dividing or separating partitions of inclosed space, of two or more heat-absorbing-coils and connecting-pipes, constructed, arranged, and operating to introduce a volatile refrigerating-liquid into and to fill one of said coils, then overflow and pass into other heat-absorbing coils, thereby absorbing heat, substantially as described.

11. The combination of two or more heat-absorbing coils with a liquid-reservoir, and one or more walls or ceilings of inclosed space, when the said reservoir and coils are constructed, arranged, and operate to admit a circulating refrigerating-liquid into one of said coils and flow in an upward direction, and then pass into one or more coils and pass through the same in an upward direction, substantially as described.

12. The combination of two or more heat-absorbing coils with frames or supports to hold the same, and connecting-pipes constructed, arranged, and operating to admit a circulating refrigerating medium into and pass in an upward direction and fill one coil, and then discharge a part of said liquid into one or more coils and pass into them in an upward direction, substantially as described.

13. The combination, with one more heat-absorbing coils, of connecting-pipes provided with stop or shut-off cocks, arranged and operating to draw away from said coils any remnant remaining therein, substantially as described.

14. The combination of the coils B with the drip-pipes $f$ and stop-cocks $g$, substantially as described.

Witness my hand this 10th day of December, A. D. 1883.

JULIUS J. SUCKERT.

Witnesses:
W. L. BENNEM,
J. E. WARNER.